UNITED STATES PATENT OFFICE.

JUSTIN KAY TOLES, OF SAN FRANCISCO, CALIFORNIA, ASSIGNOR TO UNION FIBRE COMPANY, OF WINONA, MINNESOTA, A CORPORATION OF MINNESOTA.

PROCESS OF PRODUCING FIBROUS MATERIAL FROM RICE-STRAW.

1,262,872.　　　　Specification of Letters Patent.　　Patented Apr. 16, 1918.

No Drawing.　　Application filed December 20, 1915.　Serial No. 67,741.

*To all whom it may concern:*

Be it known that I, JUSTIN KAY TOLES, a citizen of the United States, and a resident of the city of San Francisco, county of San Francisco, and State of California, have invented certain new and useful Improvements in Processes of Producing Fibrous Material from Rice-Straw, of which the following is a full, clear, and exact description.

This invention relates to a novel and improved process for producing fibrous material for thermal insulation from rice straw.

At present no use is made of rice straw though many unsuccessful attempts have heretofore been made to treat and prepare it for practical use and commercial purposes. Annually, hundreds of thousands of tons of rice straw have been wasted or destroyed, usually by burning, solely because the rice straw could not be marketed heretofore, because of the lack of some means or process whereby it could be treated to change its state or condition, whereby the fiber thereof might be utilized practically and commercially. Heretofore straw-board, wall board, refrigerator felt, insulating lining, roofing material, etc., have been made of suitable materials combined with a material, such as flax straw, which latter furnished the fibers that naturally bind together and act as a bond for the other materials. Besides other objections to the use of flax straw, are the highly absorbent nature of the flax fiber and its expense, which narrows its field for application commercially in competition with other products.

The main object of this invention is to provide a novel and improved process whereby it becomes possible to fiberize rice straw and thus utilize the cheap and abundant supply thereof, which now is wasted and has little or no commercial value.

Briefly, the invention consists in a process for producing fibrous material for rice straw, which consists in boiling or heating the rice straw in a nominally weak alkaline or caustic solution, and thereafter, freeing it of excess solution by pressure or otherwise. The invention further consists in the several hereinafter specified novel steps, as applied to rice straw.

In carrying out the process for producing fibrous material from rice straw, in accordance with the present invention, the rice straw is placed in a nominally weak alkaline or caustic solution, as, for instance, a solution containing one per cent. (or less than one per cent.) of caustic soda. Preferably, the solution is contained in an open vat, and it is heated to or nearly to the boiling point, and the rice straw is heated or boiled in said solution for a sufficient time to break down or destroy the refractory substances which enshroud the fibers of the rice straw. I have found that by boiling the rice straw in a weak alkaline or caustic solution in an open vat from one half to one hour, accomplishes the desired result. This constitutes the first step in the process, after which the reduced rice straw is freed of the excess alkaline or caustic solution, as, for instance, by passing it through squeeze rollers, or by the process of evaporation or by the application of heat, etc. Preferably, a slight amount of the solution is allowed to remain with the fibrous rice straw for the purpose of rendering it vermin proof, since it is contemplated to use the fibrous material principally in the manufacture of thermal insulating material.

The process herein described disintegrates the rice straw to its fibrous constituents and produces from the rice straw a fibrous material in which the fibers are not only light in weight, but they are also strong, flexible, highly resistant to moisture, and have excellent binding and felting qualities.

The fibrous material produced by the above process constitutes a cheap commercial product which is adapted to be mixed or combined with other ingredients or materials—under pressure, and heat in some cases—as a basis to form various other commercial products, such as straw-board, linoleum, wall-board, panels, refrigerator felt, insulating or sound deadening lining, roofing material, tiles, etc.

The process which has been particularly described admits of substitutions and variations of the ingredients and operations set forth, wherefore the right is reserved to all such substitutions and variations of ingredients and operations as are the equivalent thereof. I desire, therefore, not to limit myself to the exact ingredients and operations specified, but intend, with the following claims, to point out all of the invention disclosed herein.

I claim as new and desire to secure by Letters Patent:

1. The process of fiberizing rice straw, which consists in immersing the straw in a nominally weak alkaline solution and boiling the same for a sufficient time to dissolve the gummy substances surrounding the rice fibers without pulping or disintegrating the same, and thereafter freeing the fibers from excess of gums and alkaline solution.

2. The process of fiberizing rice straw, which consists of steeping it in a weak alkaline solution (not exceeding one per cent.) for a sufficient period to dissolve the gummy constituents and partially purify the fibers without disintegrating the same, and thereafter freeing the fibers of the excess of gums and alkali.

3. A process for fiberizing rice straw, which consists in first boiling the rice straw with an alkaline solution containing less than one per cent. caustic soda, in an open vat for less than sixty minutes, to break down the substances which enshroud the fibers of the rice straw, without appreciably affecting the fibers themselves, and, second, freeing the fiber from excess alkaline solution by passing it through squeeze rollers.

JUSTIN KAY TOLES.